UNITED STATES PATENT OFFICE 2,644,772

METHOD OF COATING MINERAL PARTICLES

William A. Kaye, Berkeley, Calif., assignor to Pabco Products Inc., a corporation of Delaware No Drawing. Application March 1, 1949, Serial No. 79,119

6 Claims. (Cl. 117—100)

My invention relates to the coating of objects, and more particularly to the coating of so-called roofing or siding surfacing particles which are usually in discrete particle form, and are commonly employed for adhesive union in a bituminous coating on a so-called felt or other fabric base covering material adapted for sidings or roofing in either strip or shingle form.

In the manufacture of covering material of the type described, it is the general practice to form a sheet of fibrous material such as felt, impregnate the same with a bituminous composition, such as pitch but usually asphalt, coat one or both sides with a similar bituminous composition, and while the coating on the upper surface of the sheet is in a heated state cover it with discrete particles in the form of either granules or flakes to provide a decorative as well as weather resistant and protective exposed surface when the sheet is in use. As the bituminous coating solidifies, the surfacing particles become adhesively united thereto. Usually the surfacing particles are of a mineral character such as crushed slate or rock but they may be in the form of flakes such as aluminum flakes or specially treated mica flakes. For decorative effects, it is not uncommon to provide colored coatings about the particles if they do not inherently have a desired color effect.

My invention has as its objects, among others, the provision of an improved method for providing a resinous coating on an object, such as surfacing particles of the character described, enabling the object to be coated with a large variety of colors even white if so desired, which provides protection for the surfaces coated, and which may be easily and economically performed. Other objects of my invention will become apparent from the following description thereof.

It is known that many of the resin forming polymerizable liquids, such as the styrene-monomer, alpha-methyl-styrene and various other styrene homologs, indene, para or ortho divinyl benzene, and isobutylene, can be rapidly polymerized by employing as a catalyst so-called activated clays or bleaching earths which are of the montmorillonite type, and are commonly sold under various trade names such as Filtrol D, Lacconite, Retrol, Floridin, Neutrol, Afton Clay, fuller's earth, etc. This polymerization will occur without application of heat at room temperature, and the reaction is highly exothermic.

Summarizing my invention, I have found that an object can be rapidly provided with a solid resinous surface coating by polymerizing on such surface any resin forming liquid of the character related which is polymerizable by activated clay of the character related. The coating is formed by bringing the object in contact with the activated clay polymerizable liquid and the activated clay as a catalyst, the clay remaining as a filler in the coating after the polymerization.

Surfacing particles of the type described can be quickly and efficaciously formed by polymerizing such activated clay polymerizable liquid, in the presence of the particles and with activated clay as the catalyst. Styrene is the preferred polymerizable liquid. It polymerizes about the particles as a substantially colorless solid coating, thereby lending itself readily to coloration with a large variety of colors, even white and pastel shades, which can be obtained only with difficulty with present commercial methods of color coating, such as the common heat applied sodium silicate coating. When polymerized, the resultant polystyrene polymer also provides a highly wear resistant and protective resinous coating about the particles.

Since the polymerization can be effected without application of heat at room temperature, all that is necessary is to mix thoroughly together the surfacing particles, the styrene monomer, the coloring matter when used, and the activated clay catalyst until the polymerization is completed. This can be readily determined because immediately in the presence of the activated clay catalyst, the polymerization is accompanied by a rapid rise in temperature—sometimes as high as up to 200° F. to 300° F. depending upon ambient conditions and proportions used; and when the temperature has fallen substantially from its maximum, the reaction will be complete. Although the styrene polymerizes to a substantially solid resinous coating as soon as it comes in contact with the clay, it is desirable to continue thoroughly mixing the surfacing particles together with the other substances forming the coating, to insure intimate contact of the materials, so that all the styrene will come in contact with the activated clay catalyst, and to prevent the thermoplastic coatings of adjacent particles from being fused together by cooling in a static adjacent position. For this purpose, it is generally desirable to effect such thorough mixing for 5 to 15 minutes after incorporation of the clay. The mixing also aids the polymerization reaction.

Any suitable mixing means can be employed. I have obtained best results with a so-called change can mixer commonly employed in the paint industry for the mixing of paints, and consequently prefer such type of mixer. Because of the generation of heat, cooling of the mixer may be effected by circulating water or any other suitable cooling fluid through a jacketed mixer. However, the cooling is unnecessary from a functional effect, insofar as the polymerization reaction is concerned.

To insure a complete uniform final coating over the entire surface area of each of the particles, it is desirable and, consequently, preferable to mix first the surfacing particles thoroughly in the liquid styrene monomer to effect intimate coating contact of the liquid styrene over the entire surface area of each of the particles. In this connection, the coloring matter and any other filler may be previously mixed in with the styrene, or thoroughly mixed in with the styrene-surfacing particle mixture while the mixing thereof is continued. After all solid particles have been thoroughly coated by the styrene and while the mixing is continued, the activated clay catalyst is slowly or gradually added. The activated clay is preferably gradually added last to insure that the other ingredients are thoroughly mixed together before the polymerization of the styrene to polystyrene occurs, because, as previously explained, the reaction is quite rapid and commences immediately upon introduction of the activated clay. However, the ingredients may be added in any order provided that either the clay or the styrene is added last, so that the polymerization reaction will occur with all the components present.

Insofar as proportions are concerned, any suitable proportions of the ingredients can be employed, it being important that there be sufficient styrene to coat the entire area of each of the surfacing particles, and that there be sufficient activated clay to effect substantially complete polymerization of the styrene about the particles to a solid resinous coating. A suitable ratio for this purpose is about 1 part by weight of the clay to about 1 to 5 parts by weight of the styrene. In this connection, it is immaterial if there is an excess of the styrene because any unpolymerized styrene will ultimately evaporate after completion of the reaction, as styrene is quite volatile. Any excess clay is also immaterial because the clay does not enter the reaction; and hence all the clay used ultimately serves as a filler which together with the coloring matter and any other filler which may be used, are uniformly distributed throughout the finished coating which is solid polystyrene of about 1,000 to 15,000 molecular weight (Staudinger method). After the reaction is complete, there may be a slight lumpiness in the material which soon disappears upon evaporation of any unpolymerized styrene.

An important factor in obtaining the polymerization reaction without application of heat at room temperature, to thus effect economy of operation, is that the activated clay catalyst must be dry, as any substantial amount of moisture impedes the polymerization of the styrene to polystyrene. Therefore, to insure that the activated clay is dry, it is desirable to dry the same to substantially constant weight before use. This can be readily accomplished by heating the activated clay to a temperature of about 240° F. for a length of time sufficient to bring it to substantially constant weight. Ten to twenty hours will be generally sufficient for the drying, depending upon the size of the clay particles, the type of equipment used in drying, and the original moisture content, if any, in the clay.

During the drying, agitation of the clay may be employed as this expedites the drying operation. However, tray drying may be used. After the clay is dried, it can be stored for use provided it is stored in a substantially moisture free atmosphere whereby the clay will not absorb material amounts of moisture. Otherwise, the clay should be used soon after drying thereof before it can absorb material amounts of moisture. In this connection, the clay can be allowed to cool before use. Substantial amounts of moisture may be present in the other solid ingredients, such as the coloring matter and the surfacing particles themselves. If so, they should be dried beforehand substantially to constant weight in a manner similar to drying of the activated clay. A suitable temperature for drying such other ingredients is about 180° F. for about 10 to 20 hours. It is to be understood, however, that if the activated clay or the other solid ingredients are originally free of a quantity of moisture which would impede the polymerization of the styrene, then the drying steps may be omitted.

As for particle sizes, it is desirable that the activated clay catalyst be in finely divided or powdered form, as the more finely divided it is, the more efficient it acts as a catalyst in the polymerization of the styrene, a suitable average mesh size being about 300 to 350 mesh. It is also desirable to have the activated clay in powdered form because as previously related, it ultimately serves as a filler in the polymerized styrene or polystyrene coating about the surfacing particles, and the finer it is the smoother and better appearing such coating will be. For the latter reason, it is also desirable that the coloring matter or other filler which may be included in the product be also finely divided in powdered form preferably to about the same size as the activated clay particles. The amount of coloring matter or other filler particles that may be incorporated is not particularly critical, as this depends on the particular coloring employed and the tone of color desired with such coloring matter. However, such proportions can be conveniently based upon the quantity of clay which will usually be about 1 part by weight of the activated clay to about ½ to 4 parts by weight of the coloring matter.

The surfacing particles themselves may vary widely in type, and in mesh size, depending on the particular kind of particle to be coated. If the usual form of mineral or crushed rock granules are to be coated, they may be of the conventional size now employed commercially, usually an average size of about 10 to 15 mesh. If the surfacing particles are mica flakes, for example, they may vary from 6 to 65 mesh, and preferably about 10 to 35 mesh. I have found my invention particularly applicable for the coating of mica flakes, because this results in an extremely light weight final product; and the resinous coating about such flakes including the lamellar edges thereof, serves as an excellent protecting medium therefor rendering the flakes highly weather resistant, which is not otherwise the case with unprotected flakes. In this connection, the process of my invention results in the entire outer surface of each particle being coated with the resinous coating.

With respect to the surfacing particle sizes, the amount of styrene that should be used will depend not only on such sizes which determine the total surface area of particles to be coated but also upon the particular specific gravity of such particles because the heavier the particles the greater the weight ratio with respect to the styrene. But, as previously explained by having an excess of styrene present, this insures thorough and complete coating of the particles, particularly when they are first mixed with the styrene before the activated clay is added, as one can then readily determine by this step whether the surfacing particles have been thoroughly coated with the styrene.

For ornamental purposes, the coloring matter, which may be pigments of any type, dyes, metallic powders or flakes or prepared commercial metallic powder or flake pastes, is preferably included in the resinous coating, as my method provides for ready incorporation of such coloring matter. However, the coloring matter may be omitted, and the resultant resinous coating containing the activated clay filler will provide protection, particularly for surfacing particles, such as mica flakes.

If desired, some of the styrene may be replaced by a fatty acid pitch, namely, a pitch of vegetable or animal origin, such as marine pitch, cottonseed pitch and stearine pitch, or mixtures of these pitches. Such type of pitch is soluble in the styrene, and improves adhesion of the polymerized coating to the surfacing particles. Furthermore, the pitch acts as a diluent and being cheaper than the styrene reduces the cost of the composition. For any given formulation, up to 25% by weight of the styrene may be replaced by the pitch. Stearine pitch is preferred because of its comparatively low cost.

The following is an example of a preferred type of formula which has been successfully compounded.

Example I

| | | |
|---|---|---|
| Mica flakes (10–35 mesh) | lbs | 50.00 |
| Styrene monomer | lbs | 12.80 |
| Aluminum powder (325 mesh) | lbs | 13.30 |
| Activated clay ("Filtrol D"—325 mesh and smaller) | lbs | 4.25 |

Dryness of the mica was insured by placing it on trays in a circulating air oven for 16 hours at 180° F.; and the clay was also thoroughly dried on trays in a circulating air oven at 240° F. for 16 hours. After such drying the materials were then ready for the coating and polymerization step.

An intimate mixture of the liquid styrene monomer and the aluminum powder was previously prepared by thoroughly stirring these substances in a container with a paddle; and this styrene-aluminum powder mixture was thoroughly mixed with the mica which had been previously placed in a change can type mixer of 35 gallon capacity (made by C. Ross and Son Co.). The mixing of the styrene-aluminum powder mixture with the mica was effected by first starting the mixer with the mica in it, with the base of the mixer rotating at 36 R. P. M. and the blades at 52 R. P. M.; and the aluminum powder-styrene mixture was added slowly to the mica over a period of 5 minutes while the mixing was continued. After these materials were all brought together, the mixing thereof was continued for an additional 3 minutes to insure that the particles were thoroughly coated with the styrene.

While the mixing continued, the clay was next added slowly over a period of 1 minute; and after the addition of the clay was completed, the mixing was continued for 5 minutes more. The temperature rose to 190° F. shortly after all the clay was added, and then began to cool off slowly. After the mixing was completed, the coated mica was removed from the mixer and placed about ½ in. deep on trays, and heated in a circulating air oven at 205° F. for 3 hours to remove any unpolymerized excess styrene monomer.

Upon removal from the oven, the coated mica was allowed to cool to room temperature and then screened through a 10 mesh shaker screen of a 36 in. diameter circular size. Small clusters of the coated particles which initially could not pass through the screen were entirely broken up by the shaker action so that all of the material ultimately passed through the screen. The coated mica was then ready for application as surfacing particles for roofing or the like. Substantially each particle of the mica, was coated over its entire surface area including the lamellar edges thereof, so that the mica was thoroughly protected by the resinous coating.

The formula of Example I produces a metallized coating as a result of the aluminum powder coloring effect. Instead of straight aluminum powder, commercial aluminum paste may be utilized in its place. The paste contains approximately 30 to 35 parts by weight of volatile solvent and 70 to 65 parts by weight of aluminum powder. Consequently when the paste is employed in place of the straight aluminum powder, the amount thereof should be increased proportionately. In the case of the use of paste, it may be necessary to dry the paste beforehand if relatively high boiling solvents are present in the paste, which might leave the surface of the mica tacky if the drying step were omitted. The volatile solvent in the paste evaporates rapidly under the heat of the reaction.

The following are further examples of typical formulae which have been successfully compounded, providing true and fast colors on the surfacing particles. The proportions are in parts and percent by weight.

Example II

| | |
|---|---|
| Mica flakes (10–35 mesh) | 59.5 |
| Styrene monomer | 12.5 |
| Stearine pitch (approximately 155° F. melting point) | 3.0 |
| Titanium dioxide (325 mesh and smaller) | 15.0 |
| Ground rock (325 mesh and smaller) | 5.0 |
| Activated clay ("Filtrol D"—325 mesh and smaller) | 5.0 |
| | 100.0 |

A white flake is produced by this formula. The ground rock serves as an additional filler or extender, giving more body to the coating than that provided by the activated clay alone.

Example III

| | |
|---|---|
| Expanded shale granules (10–35 mesh) | 85.5 |
| Styrene monomer | 5.0 |
| Stearine pitch (approximately 155° F. melting point) | .7 |
| Chromium oxide (325 mesh and smaller) | 4.4 |
| Activated clay ("Lacconite"—325 mesh and smaller) | 4.4 |
| | 100.0 |

A green coloration is produced by this formula. Expanded shale is a well known product, being shale heat treated to pop out the moisture, and thus produce a relatively light weight material having voids.

Example IV

| | |
|---|---|
| Puffed obsidian granules (8–14 mesh) | 88.0 |
| Styrene monomer | 5.6 |
| Iron oxide-red (325 mesh and smaller) | 4.8 |
| Activated clay ("Filtrol D"—325 mesh and smaller) | 1.6 |
| | 100.0 |

A red coating is produced. Puffed obsidian is heat treated in a manner analogous to the expanded shale, to thus produce a relatively light weight product with voids.

Example V

| | |
|---|---|
| Expanded perlite granules (8–14 mesh) | 79.0 |
| Styrene monomer | 8.4 |
| Titanium dioxide (325 mesh or smaller) | 6.2 |
| Phthalocyanine blue (325 mesh and smaller) | 2.0 |
| Activated clay ("Filtrol D"—325 mesh and smaller) | 4.4 |
| | 100.0 |

The mixture of titanium dioxide and phthalocyanine blue produces a blue color. Expanded perlite is another heat treated mineral to produce a relatively light weight product with voids.

Example VI

| | |
|---|---|
| Crushed rock granules (10–12 mesh) | 95.6 |
| Styrene monomer | 2.5 |
| Flaked copper bronzing powder (about 180 mesh) | 1.3 |
| Activated clay ("Filtrol D"—325 mesh and smaller) | 0.6 |
| | 100.0 |

A metallic appearing copper color is produced by this formula.

In all of Examples II through VI, an excess of the styrene monomer, and the dry surfacing flakes or granules are preferably first thoroughly mixed together to obtain an intimate coating of the styrene over the entire surface area of each of such particles. This can be done by either first thoroughly mixing the styrene with the surfacing particles alone, or by thoroughly mixing other of the materials, except the clay, with the styrene, and then thoroughly mixing the resultant mixture with the surfacing particles, as in Example I. If pitch is employed, it is dissolved beforehand in the styrene. If the styrene is first mixed with the surfacing particles alone, the coloring matter and any additional filler are thoroughly mixed in while the mixing of the styrene and the surfacing particles is continued. Finally, after all other material has been thoroughly coated by the styrene, the dry activated clay is gradually added while the thorough mixing is continued. After addition of the clay, the thorough mixing is continued for about 5 to 15 minutes to insure that all the styrene that can be polymerized by the activated clay, has been so polymerized. With substantially dry clay, the polymerization will occur without application of heat.

To insure dryness, the activated clay and the other solid substances may be first predried to substantially constant weight as in Example I, for the reasons previously explained. In some instances, if the mixer is not cooled and if excessive heat is generated, it may be necessary to add small particles of dry ice (solid carbon dioxide) into the batch in the mixer to cool the mixture, and reduce the tack of the mixture while in motion, which obviates packing and agglomeration. After the mixing is terminated, the coated particles are dried to remove any unpolymerized excess styrene monomer, and then screened as in example I.

Although it is preferable first to coat intimately the surfacing particles with the liquid styrene and to add the activated clay last for the reasons stated, the styrene may be added last after thorough mixing of the other ingredients. However, it is to be understood that all the components may be mixed together if they can be brought together with sufficient rapidity so that the polymerization reaction will be substantially initiated in the presence of all the components of the mixture. Also, as previously related, the styrene may be replaced by any other type of resin forming liquid that is polymerizable by activated clay to a solid resinous coating.

The activated clay is not only important in my invention in providing a quick method, which eliminates the use of expensive equipment and can be performed without application of heat, but also because it remains as a filler uniformly and homogeneously distributed in the polymerized resinous coating imparting body and weather resistance thereto. At the same time being light colored as well as the polymerized resin, it does not interfere with light coloring of the coating.

After the surfacing particles have been produced, they may be stored; and when ready for use, they may then be applied to the base material in the same manner now conventionally employed in the industry for the application of colored granules. In addition to providing a quick method for the coating of surfacing particles of the character described, it is to be understood that the principle of my invention is applicable to coating other objects and particles. For example, a non-slipping resinous surface coating may be formed on tacks or nails by coating them with a solid resin forming liquid polymerizable by activated clay, and effecting the polymerization by the clay in the manner described, with or without inclusion of coloring matter. Also, a relatively large surafce area on a large object can be provided with such resinous coating by first coating such surface with the activated clay polymerizable liquid, and polymerizing the same with the activated clay which remains in the coating as a filler.

I claim:

1. The method of forming ornamental and protective resinous coatings on discrete mica flake surfacing particles without application of heat which comprises thoroughly admixing the flakes and non-aqueous liquid polymerizable styrene monomer with dry activated clay catalyst whereby an exothermic reaction occurs causing polymerization of the monomer by the catalyst onto the discrete mica particles, and continuing said admixing to cause the discrete coated mica particles to be in substantially non-fused condition with said dry activated clay remaining in said polymerized coatings as a filler.

2. The method of forming ornamental and protective resinous coatings on discrete mica flake surfacing particles without application of heat which comprises thoroughly admixing the flakes, aluminum powder which imparts a metallic appearance to the resultant coatings, and non-aqueous liquid polymerizable styrene monomer with dry activated clay catalyst, whereby an exothermic reaction occurs causing polymerization of the monomer by the catalyst onto the discrete mica particles; and continuing said admixing to cause the discrete coated mica particles to be in substantially non-fused condition with said dry activated clay remaining in said polymerized coatings as a filler.

3. The method of forming resinous coatings on a plurality of discrete mineral particles which are substantially inert to a non-aqueous liquid compound polymerizable by dry activated clay catalyst, said compound being a monomer of the group consisting of styrene, alpha-methyl styrene, indene, para divinyl benzene, ortho divinyl benzene, and isobutylene; which comprises thoroughly admixing said discrete particles and said non-aqueous liquid polymerizable compound with said dry activated clay catalyst whereby an exothermic reaction occurs causing polymerization of the monomer by the catalyst onto the discrete mineral particles, and continuing said admixing to cause the discrete coated particles to be in substantially non-fused condition with said dry activated clay catalyst remaining in said polymerized coatings as a filler.

4. The method of forming resinous coatings on a plurality of discrete mineral particles which are substantially inert to a non-aqueous liquid compound polymerizable by dry activated clay catalyst, said compound being a monomer of the group consisting of styrene, alpha-methyl styrene, indene, para divinyl benzene, ortho divinyl benzene, and isobutylene; which comprises without application of heat thoroughly admixing said discrete particles and said non-aqueous liquid polymerizable compound with said dry activated clay catalyst whereby an exothermic reaction occurs causing polymerization of the monomer by the catalyst onto the discrete mineral particles, and continuing said admixing to cause the discrete coated particles to be in substantially non-fused condition with said dry activated clay catalyst remaining in said polymerized coatings as a filler.

5. The method of forming resinous coatings on a plurality of discrete mineral particles which are substantially inert to a non-aqueous liquid compound polymerizable by dry activated clay catalyst, said compound being a monomer of the group consisting of styrene, alpha-methyl-styrene, indene, para divinyl benzene, ortho divinyl benzene, and isobutylene; which comprises first admixing said discrete particles with said non-liquid polymerizable compound to bring said compound in intimate contact with the surfaces of said discrete particles; during said admixing adding said dry activated clay catalyst to the admixture of said particles and said compound whereby an exothermic reaction occurs causing polymerization of the monomer by the catalyst onto the discrete mineral particles; and continuing said admixing to cause the discrete coated particles to be in substantially non-fused condition with said dry activated clay catalyst remaining in said polymerized coatings as a filler.

6. The process of claim 5 in which said particles are mica flakes.

WILLIAM A. KAYE.

References Cited in the file of this patent

UNITED STATES PATENTS

| Number | Name | Date |
|---|---|---|
| 1,270,450 | Shope | June 25, 1918 |
| 1,871,895 | Luscher | Aug. 16, 1932 |
| 1,972,390 | Miner | Sept. 4, 1934 |
| 2,118,898 | Price | May 31, 1938 |
| 2,213,643 | Alton | Sept. 3, 1940 |
| 2,216,769 | Drapeau | Oct. 8, 1940 |
| 2,287,348 | Hayden | June 23, 1942 |
| 2,317,328 | Kinney | Apr. 20, 1943 |
| 2,332,220 | Harshberger | Oct. 19, 1943 |
| 2,362,489 | Jewett | Nov. 14, 1944 |
| 2,431,315 | Drummond | Nov. 25, 1947 |
| 2,460,516 | Luaces | Feb. 1, 1949 |
| 2,513,997 | Gibb | July 4, 1950 |

FOREIGN PATENTS

| Number | Country | Date |
|---|---|---|
| 524,156 | Great Britain | July 31, 1940 |